Aug. 7, 1934.　　　　J. S. BAKER　　　　1,969,113
AUTOMATIC CONTROL SYSTEM FOR WARM AIR FURNACES
Filed Dec. 3, 1932　　　3 Sheets-Sheet 1

INVENTOR
John S. Baker
Jones, Addington, Ames & Seibold
ATTYS

Aug. 7, 1934.   J. S. BAKER   1,969,113
AUTOMATIC CONTROL SYSTEM FOR WARM AIR FURNACES
Filed Dec. 3, 1932   3 Sheets-Sheet 2

INVENTOR
John S. Baker
Jones, Addington, Ames & Seibold
ATTYS.

Aug. 7, 1934.  J. S. BAKER  1,969,113
AUTOMATIC CONTROL SYSTEM FOR WARM AIR FURNACES
Filed Dec. 3, 1932  3 Sheets-Sheet 3
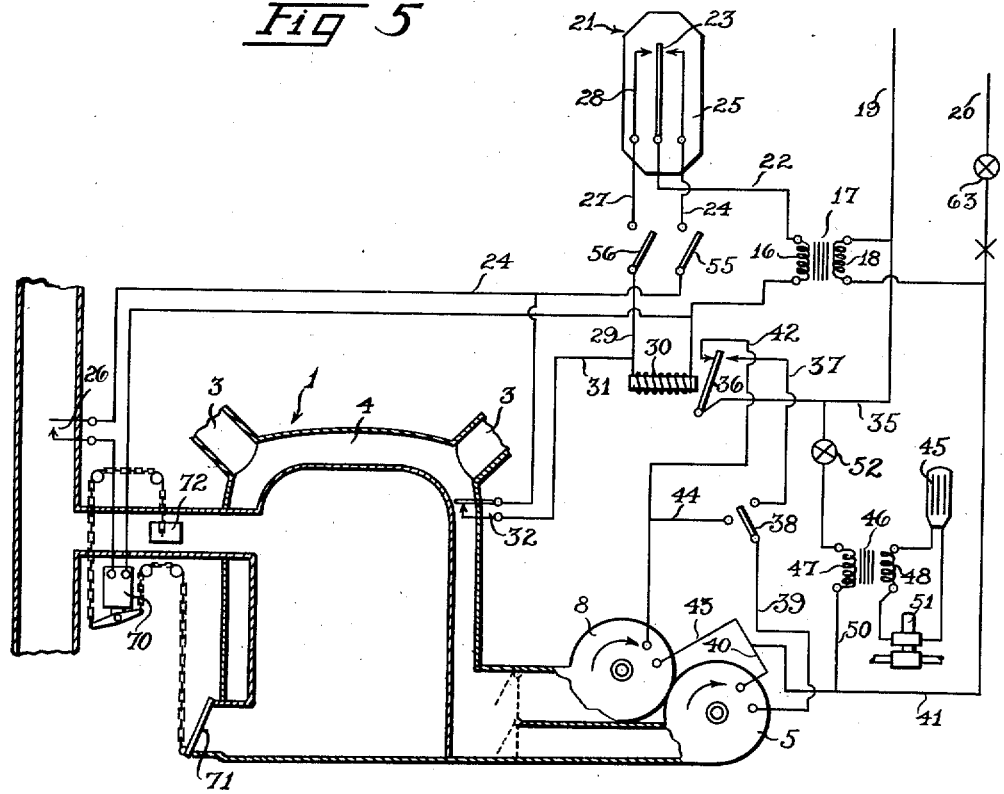
INVENTOR
John S. Baker
Jones, Addington, Ames & Seibold
ATTYS Patented Aug. 7, 1934

1,969,113

UNITED STATES PATENT OFFICE 1,969,113

AUTOMATIC CONTROL SYSTEM FOR WARM AIR FURNACES

John S. Baker, Chicago, Ill., assignor to Cook Electric Company, Chicago, Ill., a corporation of Illinois Application December 3, 1932, Serial No. 645,556

15 Claims. (Cl. 236—11)

This invention relates to control apparatus principally for use with hot air furnaces.

More particularly, this invention relates to control apparatus adapted for use with hot air furnaces wherein forced drafts are utilized to support combustion and to bring heated air from the furnace into the room, the apparatus being preferably under the control of the thermostat in the room. It will be understood, however, that the invention is not limited to hot air furnaces utilizing forced drafts to support combustion and to supply heated air to the room, but may be used in ordinary heating systems employing equivalent instrumentalities of control for maintaining a relatively uniform room temperature.

In heating systems employing hot air furnaces, as heretofore provided, it has been customary to maintain the control of the furnace under the room thermostat and intermittently increase the rate of combustion as the room temperature drops and the thermostat calls for heat. It has been found, however, that intermittent operation of the heating system results in air stratification, with a temperature of 70° Fahr. (for example) in the region of the thermostat, which will satisfy the thermostat, and a lower temperature of several degrees at or directly above the floor. This condition is known as a "cold 70", is very undesirable, and may be overcome chiefly by continuous air circulation. On the other hand, in view of poor conditions of chimneys and the uncertainties and variations of them, natural drafts have been found at times to be insufficient to secure proper combustion, particularly when outside conditions might tend to check the natural draft, although the room thermostat might be calling for heat and the outside temperature low enough to require a prompt response by the furnace to increase the combustion in order to prevent serious chilling of the room. Forced drafts for increasing combustion have been employed, however, but difficulty has been experienced in securing a heating system satisfactorily bringing the heated air into the room to prevent stratification of the air and a "cold 70", and maintain a proper warm air circulation for heating of the room, in combination, with a forced draft for increasing the rate of combustion of the furnace sufficiently to prevent chilling of the room when the thermostat calls for heat.

In my copending application, Ser. No. 645,555, filed of even date herewith, I have disclosed and claimed an improved control apparatus adapted particularly to hot air heating systems controlled by a room thermostat, wherein a single blower may operate at different speeds to supply varying amounts of air, preferably according to the hot or cold condition of the furnace, whereby to provide a forced draft to the fire box if the furnace is cold and the room thermostat is calling for heat, maintaining, however, a part of the draft to the room providing continuous circulation, and to increase the circulation or draft to the warm air duct of the furnace and the room as soon as the furnace is hot. A damper controller functions to control the movement of the blower discharge at high or low speeds so as to direct the blower discharge according to the requirements of the heating apparatus or system.

An object of the present invention is to provide similar control apparatus, but of improved construction, for heating systems preferably of the hot air type, although not necessarily limited thereto, capable of operating according to the conditions of the furnace and the room temperature whereby a forced draft may be supplied to the furnace and a circulation of warm air to the warm air duct leading to the room or rooms to be heated, or to the warm air duct alone, depending upon the furnace temperature at the time the furnace calls for heat.

The present invention distinguishes over the invention disclosed and claimed in my copending application by accomplishing the aforesaid results by the use of a plurality of blowers, instead of a single blower, this being preferred in many cases due to local requirements, design of construction and choice.

A further object of the invention is to provide, therefore, control apparatus of this type capable of operating two or more blowers, or other means furnishing the draft, whereby to obtain the proper forced draft and operation of the furnace in conjunction with a proper circulation of air to the warm air duct, preferably of increased amount upon a predetermined rise of furnace temperature, to maintain a relatively uniform room temperature at all times.

A further object of the invention is to provide an electrical system wherein thermostatic means responsive to furnace temperature may control the operation of the forced draft of a series of blowers, either to increase the rate of combustion or to increase the rate of delivery of heated air into the room, upon operation of the thermostat responsive to room temperature.

A further object of the invention resides in providing an improved forced draft control of the type above described adapted for summer or winter use, wherein the temperature of the room may be lowered and the air more effectively cooled in the summer months by keeping the air in constant circulation.

A still further object of the invention resides in control apparatus for warm air heating systems which includes humidity controlling means adapted to operate at such times as to supply proper amounts of moisture to the warm air and maintain the humidity of the room to be heated at a predetermined value, there being means to operate the humidity controlling means according to humidity conditions and temperature requirements of the room.

A still further object of the invention resides in control apparatus for warm air heating systems in which humidity controlling means may be employed to accomplish the results above mentioned, yet capable of use with a summer control arranged effectively to cool the room by keeping the air in circulation and to wash the air, if so desired, to maintain a relatively lower temperature, or a relatively uniform cool temperature.

Other objects and advantages of the invention will be apparent from the following detailed description taken in connection with the accompanying drawings, in which Figure 1 is a view partly diagrammatic and partly structural of circuits and apparatus embodying the invention;

Fig. 5 is a view similar to Figs. 1 and 2 but showing a modification.

The control apparatus preferably includes a pair of motor driven blowers of conventional type but of different capacities adapted to maintain a constant circulation of a small quantity of air through the warm air duct of a furnace and to the rooms until the room thermostat calls for heat. When the room thermostat calls for heat, the control apparatus acts to divert a portion of the small air supply, delivered by the blower of smaller capacity, into the fire box of the furnace to act as a forced draft and to allow the remaining air from this blower to circulate through the duct and into the room, which, due to the lower rate of air motion, tends to produce a sensible increase in temperature in the room. When the forced draft increases the combustion and raises the furnace temperature, the control apparatus cuts out the blower of low capacity and operates the blower of high capacity to increase the air circulation. The air discharged by the blower of high capacity will enter the warm air duct, will be heated and then be conducted to the room until the room thermostat has been satisfied and its circuit opened. By arranging the control apparatus to keep at least one of the blowers continuously operating, overcomes any tendency of the furnace to overheat and cause serious damage and prevents a "cold 70" in the room.

There is included in the control apparatus a relay operating under the control of a furnace thermostat for determining which of the blowers of different capacity will operate. The control apparatus may further include a humidstat adapted to operate at the proper time to control the humidity of the air supplied to the blowers and to the room through the furnace air duct according to the humidity requirements of the air already in the room. In the event it is desirable to utilize the heating system as a ventilating and cooling system during the summer months, a summer and winter control may be incorporated and the room thermostat employed to control the apparatus according to room temperature. The relay may be operated by the room thermostat, instead of the furnace thermostat, when a predetermined high room temperature is reached, to operate both blowers, thereby increasing the capacity of the air circulation for this purpose when the system is converted into a summer control. The humidity control may be used either when both blowers are operating or when the blower of high capacity is operating, not only to control the humidity of the air supplied to the room but also to cool the air by washing it if so desired.

Figures 1, 4:
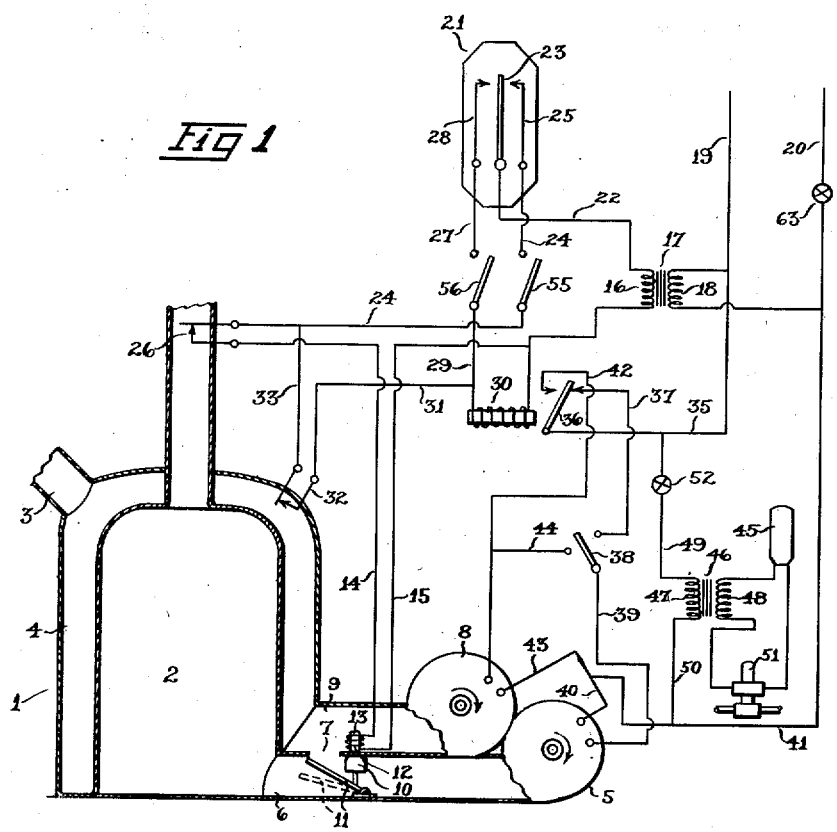
Fig. 4 is a detail view illustrating an oil or gas fired furnace connected in a system embodying the present invention.

Referring to Fig. 1, it will be understood that the furnace may be of any type other than that of the warm air type, and there may be used coal or other solid fuel such as oil or gas suitable arrangements being made in connection with the control apparatus for such well known variations in the heating art.

Furnace 1 includes a fire box 2, a warm air duct 4, forming a bonnet for the furnace, and one or more warm air ducts 3 leading to the room or rooms to be heated. A blower 5 of low capacity is illustrated as communicating with the fire box 2 by a passage 6 and with warm air duct 4 by an opening 7. A blower 8 of high capacity is illustrated as communicating with warm air duct 4 by a passage 9.

An electrically operated damper controller 10 is arranged to actuate a damper 11 adapted to swing to open and closed positions at or adjacent opening 7. Opening 7 may in effect place passage 6 in communication with passage 9.

Damper 11 may be pivotally mounted to close passage 6 leading to fire box 2 of furnace 1 from communication with blower 5 when swung to closed position, as shown in full lines in Fig. 1, and to place passage 6 in communication with this blower 5 when swung to its open position as shown in dotted lines. It will be understood that the exact location or movement of damper 11 to accomplish the results herein disclosed need not be limited as shown in the drawings because it will be obvious to those skilled in the art that various other damper constructions may be provided without departing from the essence of the present invention.

Electrically operating controller 10 may include any suitable motor, but as shown, may be a vapor motor having a heating element 12 and a coil 13 arranged in a circuit including wires 14 and 15. It is not necessary to describe in detail the construction of a vapor motor, because any suitable type of motor may be used. It is only essential to employ a prime mover capable of operating damper 11 to place passage 6 in communication with blower 5, when it is desired to provide a forced draft to the fire box to increase the rate of combustion and to close this passage when the heat of the furnace rises above a predetermined temperature.

The motor circuit, including wires 14 and 15, may include a secondary coil 16 of a transformer 17 having its primary coil 18 connected across the line wires 19 and 20. The circuit of room thermostat 21 includes a wire 22 connecting a movable contact 23 with primary coil 16 of transformer 17, a wire 24 connecting a cold contact 25 with a stack switch 26 and a wire 27 connecting a hot contact 28 with a wire 29 of a control element 30, such as a relay, together with a wire 31, which connects a furnace thermostat 32 with stack switch 26 by a wire 33. Furnace thermostat 32 may be, if so desired, of any conventional construction acting to open a circuit, including wires 31 and 33, when the furnace is cold. On the other hand, stack switch 26 is adapted to remain closed but will open to break the motor circuit of electrically operated damper controller 10 when the furnace overheats and its temperature rises above a point making a continued accelerated rate of combustion unsafe. Stack safety controls of this type and for this purpose are well known and have been in use for many years. With this motor circuit normally maintained closed at stack switch 26, the closing of room thermostat 21 upon a predetermined drop of room temperature will operate damper controller 10 and swing damper 11 to open position. Furnace thermostat 32 is adapted to energize relay 30 upon a predetermined rise of furnace temperature, while room thermostat 21 is still calling for heat.

The circuit of the small blower 5 includes wire 35, armature 36, wire 37, switch 38, if the heating system is set for winter control, wire 39, blower 5, wire 40 connecting by means of a wire 41 to the opposite side 20 of the line.

The circuit of the large blower 8 includes wire 35 leading from one side 19 of the line, armature 36, wire 42, blower 8, wire 43 to wire 41 and the opposite side 20 of the line.

If the heating system is set for summer operation, to-wit, to provide ventilation and cooling of the air in the room, the circuit of small motor 5 comprises wire 35 from side 19 of the line, armature 36, wire 42, wire 44, switch 38, wire 39, blower 5, wire 40 and wire 41 leading to the opposite side 20 of the line. The circuit of large blower 8 will be the same for summer operation as it is for winter operation.

A humidity control for maintaining a predetermined humidity of the air supplied by blowers 5 and 8 to the room may be provided. The circuit of the humidity control includes a transformer 46 having a primary coil 47 and a secondary coil 48, the primary coil 47 being connected by wires 49 and 50 at any suitable point across the line, such as across the wires 35 and 41, the secondary coil 48 including humidstat 45 and any conventional type of humidifier 51. As the heating system herein disclosed is automatic in operation, a suitable switch 52 may be provided to cut out the circuit of the humidity control.

The operation of the control apparatus above described will now be given. Assume that the heating system is intended for winter use and a winter switch 55 is closed to place cold contact 25 in the circuit and a summer switch 56 is opened to disconnect hot contact 28 of room thermostat 21 from the circuit, while switch 38 is moved to winter position. If the temperature in the room has dropped sufficiently to close the thermostatic circuit across contacts 23 and 25 and the furnace is cold, with stack switch 26 closed, electrically operated damper controller 10 will swing damper 11 to open position to allow a portion of the air discharge of blower 5 to enter fire box 2. With the heating system set for winter control, one of the two blowers will constantly operate; that is to say, if a room condition prevails where thermostat 21 is satisfied and not calling for heat, blower 5 will operate to furnish a predetermined circulation of air, notwithstanding, to warm air duct 4 and to the rooms through ducts 3 to prevent a condition known as a "cold 70". If the temperature of the room drops and electrically operated damper 10 opens damper 11, a portion of the air discharge of blower 5 is utilized to increase the rate of combustion in fire box 2. The remaining portion of the air discharge of blower 5 continues to pass through warm air duct 4, duct 3, and to the room, which, due to the decreased flow of air to the room, creates a sensible increase of temperature, this occurring advantageously at a time when it is desirable to restore the room temperature as soon as possible.

Increasing the rate of combustion of the furnace will raise the temperature of the furnace, and when a predetermined temperature is reached, thermostat 32 will close. The closing of furnace thermostat 32 energizes the control relay 30, whereby to open the circuit of small blower 5 and close the circuit of large blower 8.

Assuming that the control relay is energized, as stated, the current will flow from one side 19 of the line through wire 35, armature 36, wire 42, blower 8, wire 43 and return by wire 41 to the opposite side 20 of the line. The cooling effects of the air discharge of blower 8 will tend to return the damper 11 of the electrically operated damper controller 10 to closed position, if the prime mover of this controller is a heat motor with its heating unit 12 arranged in the path of the air flow from the blower, as shown in Fig. 1. This tendency to return the damper 11 of controller 10 to closed position is desirable, because it will decrease the amount of air from blower 8 that may enter the fire box.

The increased air discharge of blower 8 will enter warm air duct 4 and pass by way of ducts 3 to the room. If the furnace is chilled by the air of blower 8 before room thermostat 21 is satisfied, furnace thermostat 32 will open, whereby to cut out the large blower 8 and operate the small blower 5, the electrically operated damper controller 10 swinging the damper 11 to full open position and again supplying a portion of the air discharge of blower 5 to the fire box. Again, the increased rate of combustion will bring the furnace temperature to a predetermined value and cause furnace thermostat 32 to close, whereby to cut out small blower 5 and operate large blower 8. This cycle of operation will continue until room thermostat 21 is satisfied and its circuit is opened at cold contact 25.

In the embodiment of the invention above described, I contemplate operating blowers 5 and 8 alternatively and to connect the circuit of the humidity control in the system to allow operation thereof to deliver moisture to the room during the operation of large blower 8. Humidstat 45, suitably located in the room, will actuate its circuit to operate humidifier 51 and to increase the humidity of the air being supplied to large blower 8 according to the humidity conditions of the air in the room. It is contemplated that humidifier 51 may be of any conventional type connected with the intake of large blower 8 in any well known way.

Figure 2:
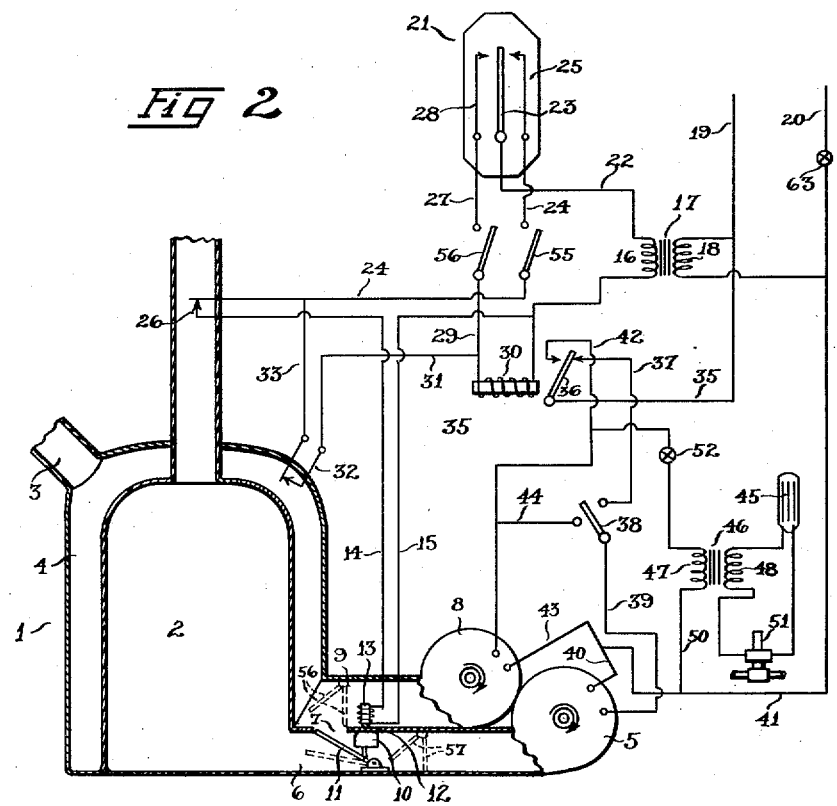
Fig. 2 is a similar view but showing a modification.

It will be noted that gravity operated dampers 56 and 57 of Figs. 2 and 4 are pivotally mounted in passages 9 and 6, respectively, to prevent the air discharge of one blower from backing up into the opposite blower.

Assume now that the heating system is set for summer operation. Winter switch 55 is opened and summer switch 56 is closed. Switch 38 is thrown from engagement with the contact of wire 37 to engagement with the contact of wire 44. If the temperature of the room rises to a predetermined value, the circuit across hot contact 28 is closed and control relay 30 is energized to close the circuits of both blowers 5 and 8. By changing the position of switch 38, as just described, the circuit of small blower 5 is not closed until control relay 30 is energized, as distinguished from it remaining closed whenever control relay is not energized during use of the heating system for winter operation.

Figure 3:
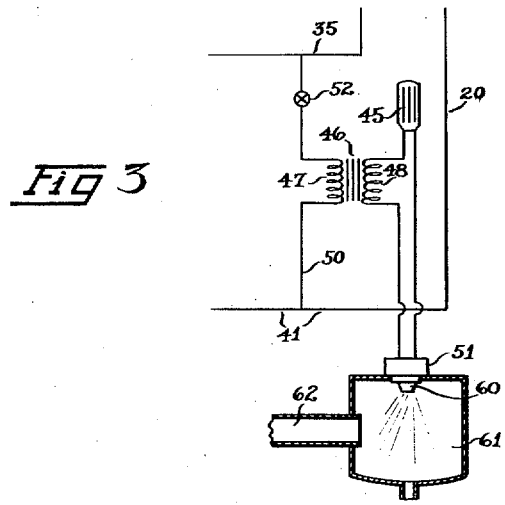
Fig. 3 is a detail view of the humidity control.

Current will flow through the closed circuits of both blowers 5 and 8 from one side 19 of the line through wire 35, armature 36, wire 42, blower 8, wire 43, a portion of the current flowing through wire 44, switch 38, wire 39, blower 5 and wire 40, the current then continuing from both blower circuits by a common return wire 41 to the opposite side 20 of the line. Thus it will be noted that both blowers 5 and 8 will operate during summer use of the system to provide a comfortable ventilation of air in the room and a cooling of the air, which, if so desired, might be accomplished, as for example, by utilizing the humidifier 51 as an air washer 60, as illustrated in Fig. 3. Humidifier 51 may then be any suitable type of sprayer or sprayers located in say a tank 61 having the usual air inlet and a pipe 62 leading to the intake of one or both of the blowers 5 and 8.

By referring to Fig. 2, it will be noted that the modified circuit connection permits the operation of the humidity control, preferably only when large blower 8 operates. Instead of wire 49 connecting across the circuit at wire 35, I arrange to connect it to wire 42, as illustrated, so that the current will not flow through the primary circuit of humidity transformer 46 until control relay 30 is energized and the current flows through the circuit of large blower 8.

The control apparatus disclosed and claimed is entirely automatic in its operation and may be converted into winter or summer use by the simple operation of the switches 55, 56 and 38. In the event any condition arises not requiring the humidity control to operate in the system, switch 52 may be opened to cut out the circuit of this control. If the entire system is to be shut down at any time, a switch 63 provided in the line above transformer 17 may be opened.

From the foregoing description it will be observed that the control apparatus provides for furnishing only a small quantity of air as required for combustion, a larger quantity of air to carry the heat to the room or rooms to be heated, and a still larger capacity which is desirable for cooling purposes in summer, always providing, however, a continuous circulation of air to overcome a "cold 70" condition in the room.

As before stated, furnace 1 may be of any suitable type and fired by coal, or other solid fuel, or liquid fuel such as oil or gas. In Fig. 4, I have illustrated diagrammatically an electrically operated control 65, such as an oil valve or gas valve, connected in parallel across the wires 14 and 15 of the motor circuit of the damper controller 10, which will operate to supply fuel in varying amounts as may be necessary to control the rate of combustion, when thermostat 21 calls for heat and damper controller 10 operates to allow a portion of the air circulation to enter the fire box as a forced draft. Control 65 is merely illustrative of one way in which the present apparatus may be adapted to different furnaces or heating systems.

In Fig. 5, the apparatus for furnishing a draft to increase the rate of combustion in the fire box of a furnace comprises a separate electrically operated draft control 70 for controlling the draft damper 71 and check damper 72. The circuit connections are substantially the same as shown in Fig. 1. Blower 5 operates to provide a continuous circulation of air, while room thermostat 21 is opened and the draft damper 71 is closed and the check damper 72 is opened. After the damper 70 operates by the closing of the hot contact 25 of room thermostat 21, the check damper 72 is closed and the draft damper 71 is opened. The rate of combustion is accelerated and the smaller blower 5 continues to operate to furnish a relatively small circulation of warm air to the warm air duct 4 of furnace 1 until the temperature of the furnace rises to a predetermined degree and closes the furnace thermostat 32. The circuit connections operate in the manner heretofore described to cut in the larger blower 8 and cut out the smaller blower 5. This relation exists until the room thermostat 21 operates to open the circuit at hot contact 25, or until the increased circulation of air has cooled the warm air duct 4 enough to affect furnace thermostat 32. In case of the latter event occurring, the continued increased rate of combustion will tend to increase the furnace temperature again whereby to operate the large blower 8 and stop the small blower 5 until the room thermostat 21 is satisfied.

It will be understood, however, that the arrangements herein described may be varied somewhat without necessarily departing from the essence of the invention. Furthermore, certain features of control, which are new and novel, may be used in various ways from that shown in the structure herein disclosed by me as illustrating merely a physical embodiment of the invention.

I claim:

1. In a heating system, a furnace including a warm air duct, a blower of small capacity discharge to provide a circulation of air to a room to be heated, a blower of large capacity discharge to provide a circulation of air to said room, means controlling the circulation of air from said blowers, a thermostat responsive to temperature variations of said room controlling said means, and means controlled by the furnace temperature for operating one or the other of said blowers.

2. In a heating system, a furnace, a blower of small capacity discharge to provide a circulation of air to a room to be heated, a blower of large capacity discharge to provide a circulation of air to said room, a thermostat responsive to temperature variations of said room, and means for controlling the circulation of air from one or the other of said blowers according to the condition of said room thermostat.

3. In a heating system, a furnace, a blower of small capacity discharge to provide a circulation of air to a room to be heated, a blower of large capacity discharge to provide a circulation of air to said room, a thermostat responsive to temperature variations of said room, and means interposed between said blowers and said room thermostat for controlling either blower.

4. In a heating system, a furnace, a blower of small capacity discharge to provide a circulation of air to a room to be heated, a blower of large capacity discharge to provide a circulation of air to said room, a thermostat responsive to temperature variations of said room, and connections between said blowers and said room thermostat by means of which both blowers may operate.

5. In a heating system, a furnace, a blower of small capacity discharge to provide a circulation of air to a room to be heated, a blower of large capacity discharge to provide a circulation of air to said room, a thermostat responsive to temperature variations of said room, and means interposed between said blowers and said room thermostat by permitting the operation of either or both blowers.

6. In a heating system, a furnace including a warm air duct, a blower of small capacity discharge to provide a circulation of air to a room to be heated, a blower of large capacity discharge to provide a circulation of air to said room, a thermostat responsive to temperature variations of said furnace, control apparatus for operating one or the other of said blowers, said control apparatus including means for furnishing at least a portion of the air circulation of one of said blowers as a forced draft for said furnace to increase its rate of combustion, and a thermostat responsive to temperature variations of said room effective to also control said means.

7. In a heating system, a furnace including a warm air duct, a blower of small capacity discharge to provide a circulation of air to a room to be heated, a blower of large capacity discharge to provide a circulation of air to said room, a thermostat responsive to temperature variations of said furnace, control apparatus for operating one or the other of said blowers, said control apparatus including means for furnishing at least a portion of the air circulation of said blower of small discharge as a forced draft for said furnace to increase its rate of combustion, and a thermostat responsive to temperature variations of said room effective to also control said damper controller.

8. In a heating system, a furnace including a warm air duct, a blower of small capacity discharge to provide a circulation of air to a room to be heated, a blower of large capacity discharge to provide a circulation of air to said room, a thermostat responsive to temperature variations of said furnace, control apparatus for operating one or the other of said blowers, said control apparatus including a damper controller for diverting a portion of the air circulation of said blower of small discharge as a forced draft for said furnace to increase its rate of discharge, and a thermostat responsive to temperature variations of said room effective to also control said damper controller.

9. In a heating system, a furnace, a pair of blowers to provide independent circulations of air to a room to be heated, a thermostat responsive to temperature variations of said room, thermostatic apparatus responsive to temperature variations of said furnace, a damper controller, and control means for determining which of said blowers shall operate, said damper controller being controlled by said furnace thermostatic apparatus upon a cold condition of said furnace to divert at least a portion of the circulation of air of one of said blowers upon a predetermined drop of room temperature.

10. In a heating system, a furnace including a warm air duct, a pair of blowers of different capacity discharges for supplying a circulation of air to said warm air duct and a circulation of air to said furnace to control its rate of combustion, thermostatic apparatus responsive to temperature variations of said furnace and of a room to be heated, control means for determining which of said blowers shall operate and for diverting at least a portion of the circulation of air of one of said blowers to said furnace, and connections between said thermostatic apparatus and said control means by means of which one of said blowers will operate to divert at least a portion of its air circulation to said furnace for a predetermined period, and thereafter the other blower will operate to furnish a circulation of air to said warm air duct.

11. In a heating system, a furnace including a warm air duct, a pair of blowers of different capacity discharges for supplying a circulation of air to said warm air duct and a circulation of air to said furnace to control its rate of combustion, thermostatic apparatus responsive to temperature variations of said furnace and of a room to be heated, control means for determining which of said blowers shall operate and for diverting at least a portion of the circulation of air of one of said blowers to said furnace, and connections between said thermostatic apparatus and said control means by means of which one of said blowers will operate to divert at least a portion of its air circulation to said furnace for a predetermined period, and thereafter the other blower will operate to furnish a circulation of air to said warm air duct, said room thermostat controlling said connections to discontinue the operation of the second blower and to resume the operation of the first blower.

12. In a heating system, a furnace including a warm air duct, a pair of blowers of different capacity discharges for supplying a circulation of air to said warm air duct and a circulation of air to said furnace to control its rate of combustion, thermostatic apparatus responsive to temperature variations of said furnace and of a room to be heated, control means for operating one of said blowers to provide a small circulation of air to said warm air duct independently of the action of said thermostatic apparatus, a damper controller for diverting at least a portion of said small circulation of air to said furnace upon a predetermined drop of room temperature, and connections between said control means and said thermostatic apparatus for stopping said blower of small capacity discharge and for operating the blower of larger capacity discharge upon a predetermined rise of furnace temperature.

13. Control apparatus for heating systems comprising a furnace having combustion producing means therein, a circuit including a thermostat responsive to temperature variations of a room to be heated, thermostatic apparatus in said circuit responsive to hot and cold conditions of the furnace, motor driven blowers for producing a circulation of air to the furnace for heating the room and a forced draft to said combustion producing means to control the rate of combustion, circuit connections for said motor driven blowers by means of which at least one of said blowers operates continuously irrespective of the condition of said room thermostat, and a control relay in said thermostat circuit controlling said circuit connections of said motor driven blower according to the temperature of said furnace for stopping one of said blowers and operating the other blower.

14. Control apparatus for heating systems comprising a furnace having combustion producing means therein, a plurality of motor driven blowers of relatively different speeds for producing a circulation of air to the furnace to heat the room and a forced draft to said combustion producing means to control the rate of combustion, a control circuit including a thermostat responsive to temperature variations of said room and thermostatic apparatus responsive to temperature variations of said furnace, a control device in said circuit for controlling the circuit connections of said motor driven blowers, and means in said control circuit and said circuit connections of said motor driven blowers by means of which the air discharge of said blowers may be simultaneously supplied as a cooling and ventilating medium to said room.

15. Control apparatus for heating systems comprising a furnace having combustion producing means therein, a plurality of motor driven blowers of relatively different speeds for producing a circulation of air to the furnace to heat the room and a forced draft to said combustion producing means to control the rate of combustion, a control circuit including a thermostat responsive to temperature variations of said room and thermostatic apparatus responsive to temperature variations of said furnace, a control device in said circuit and controlled by said furnace thermostatic apparatus for controlling the circuit connections of said motor driven blowers whereby one or the other blower will operate, means in said circuit for disconnecting said furnace thermostatic apparatus from said circuit and placing said control device under the control of said room thermostat, and means in said circuit connections for operating both of said motor driven blowers when said control device is actuated.

JOHN S. BAKER.

CERTIFICATE OF CORRECTION.

Patent No. 1,969,113.      August 7, 1934.

JOHN S. BAKER.

It is hereby certified that error appears in the printed specification of the above numbered patent requiring correction as follows: Page 5, lines 39 and 40, claim 7, for "damper controller" read means; and that the said Letters Patent should be read with this correction therein that the same may conform to the record of the case in the Patent Office.

Signed and sealed this 11th day of September, A. D. 1934.

Leslie Frazer

Acting Commissioner of Patents.

(Seal)

ing a circulation of air to the furnace to heat the room and a forced draft to said combustion producing means to control the rate of combustion, a control circuit including a thermostat responsive to temperature variations of said room and thermostatic apparatus responsive to temperature variations of said furnace, a control device in said circuit for controlling the circuit connections of said motor driven blowers, and means in said control circuit and said circuit connections of said motor driven blowers by means of which the air discharge of said blowers may be simultaneously supplied as a cooling and ventilating medium to said room.

15. Control apparatus for heating systems comprising a furnace having combustion producing means therein, a plurality of motor driven blowers of relatively different speeds for producing a circulation of air to the furnace to heat the room and a forced draft to said combustion producing means to control the rate of combustion, a control circuit including a thermostat responsive to temperature variations of said room and thermostatic apparatus responsive to temperature variations of said furnace, a control device in said circuit and controlled by said furnace thermostatic apparatus for controlling the circuit connections of said motor driven blowers whereby one or the other blower will operate, means in said circuit for disconnecting said furnace thermostatic apparatus from said circuit and placing said control device under the control of said room thermostat, and means in said circuit connections for operating both of said motor driven blowers when said control device is actuated.

JOHN S. BAKER.

CERTIFICATE OF CORRECTION.

Patent No. 1,969,113.            August 7, 1934.

JOHN S. BAKER.

It is hereby certified that error appears in the printed specification of the above numbered patent requiring correction as follows: Page 5, lines 39 and 40, claim 7, for "damper controller" read means; and that the said Letters Patent should be read with this correction therein that the same may conform to the record of the case in the Patent Office.

Signed and sealed this 11th day of September, A. D. 1934.

Leslie Frazer

Acting Commissioner of Patents.

(Seal)